United States Patent [19]

Winter

[11] Patent Number: 4,514,161

[45] Date of Patent: Apr. 30, 1985

[54] HYDRAULIC ROLL PROTECTION SYSTEM

[75] Inventor: William J. Winter, Trumbull, Conn.

[73] Assignee: USM Corporation, Farmington, Conn.

[21] Appl. No.: 559,952

[22] Filed: Dec. 9, 1983

[51] Int. Cl.³ .......................... B29C 15/00; B30B 3/04
[52] U.S. Cl. ..................................... 425/154; 425/194; 425/367; 384/256
[58] Field of Search ............... 425/141, 194, 363, 367, 425/DIG. 235, 151, 154, DIG. 45; 264/175; 29/113 R; 384/256

[56] References Cited

U.S. PATENT DOCUMENTS

| 2,575,590 | 11/1951 | Goulding | 425/363 |
| 2,678,465 | 5/1984 | Schnuck et al. | 425/367 |
| 2,785,021 | 3/1957 | Whittum | 384/256 |
| 3,115,672 | 12/1963 | Seanor | 425/DIG. 235 |
| 3,389,588 | 6/1968 | Reinhardt et al. | 425/DIG. 235 |
| 3,555,596 | 1/1971 | Thieme | 425/DIG. 235 |
| 3,936,258 | 2/1976 | Lake | 425/367 |
| 4,015,919 | 4/1977 | Pawelczyk | 425/367 |
| 4,260,578 | 4/1981 | Moody | 425/367 |

Primary Examiner—J. Howard Flint, Jr.
Attorney, Agent, or Firm—Vincent A. White

[57] ABSTRACT

A hydraulic roll protection system in which positioning of an adjustable roll relative to a fixed roll is caused by adjusting screws acting on movable journal boxes through a pressurized piston cylinder device. A relief valve between a hand pump and the cylinder acts to relieve excessive pressures. A switch valve connects the hand pump alternately to advance the roll journal to normal gap positions and to retract the roll from the fixed roll.

6 Claims, 3 Drawing Figures

HYDRAULIC ROLL PROTECTION SYSTEM

FIELD OF THE INVENTION

This invention relates to a protection system for pressure application between cooperating rolls of mills and calenders.

DESCRIPTION OF THE PRIOR ART

In the field of calendering or otherwise processing sheet material between two or more cooperating rolls, it is known to adjust the gap or nip between rolls to obtain a sheet or web of material of desired thickness. Such adjusting mechanisms are shown in U.S. Pat. Nos. 2,678,465 and 2,785,021. In U.S. Pat. No. 2,785,021 there is shown a pair of cooperating rolls one of which is journalled in substantially fixed bearings and the other of which is journalled in bearings adjustable toward and away from the first roll to adjust the gap or nip between the rolls. For so adjusting the other roll the bearings therefor are slidable toward and away from the fixed bearings for the first roll according to the setting of adjusting screws mounted in frames for the bearings and abutting each bearing. Springs between opposed bearings for the rolls hold the rolls apart to the extent permitted by the adjusting screws.

In U.S. Pat. No. 2,687,465 there is shown a similar type roll adjusting means but which also includes a hydraulic cylinder interposed between the end of each adjusting screw and its associated bearing. The arrangement is such that the pressure of the adjusting screw is transmitted by hydraulic means to the bearing. The pressure in the cylinder is regulated by a combination of a piston in a hydraulic cylinder being pressurized by a pneumatic cylinder piston device as controlled by air pressure regulators.

In many rubber and plastic mills, shear pins or plates protect the rolls against excessive roll loads such as may be encountered with excessive roll closing forces or introduction of foreign objects between the rolls. With excessive forces, the shear devices are designed to break permitting the rolls to open. When these shear devices break, many hours are spent replacing the mechanism. Also due to manufacturing inaccuracies, shear pins and plates do not always fracture at their design stress, leaving the mill either over or under protected.

Accordingly, it is a general object of the invention to provide mechanisms for quick relief of roll pressure and quick resetting of the roll gap or nip after relief of the rolls. In addition, fast roll opening is provided on overloaded as well as roll stopping and/or reversing which is especially advantageous in the event of accidental introduction of parts of an operator's body between the rolls.

SUMMARY OF THE INVENTION

A fluid pressure cylinder is interposed between the end of each adjusting screw and its associated roll bearing so that adjusting movement of a mill roll toward a fixed roll is caused by adjustment of the screw acting through the fluid pressure in the cylinder. The fluid pressure is introduced to the cylinder by a hand pump up to a working level. A relief valve operates when an overload occurs to reduce the fluid pressure and a pressure sensitive switch is adapted to stop and/or reverse the motor driving the rolls. Operation of the cylinder is reversible to retract the adjustable roll.

DESCRIPTION OF THE PREFERRED EMBODIMENT

Figure 1:
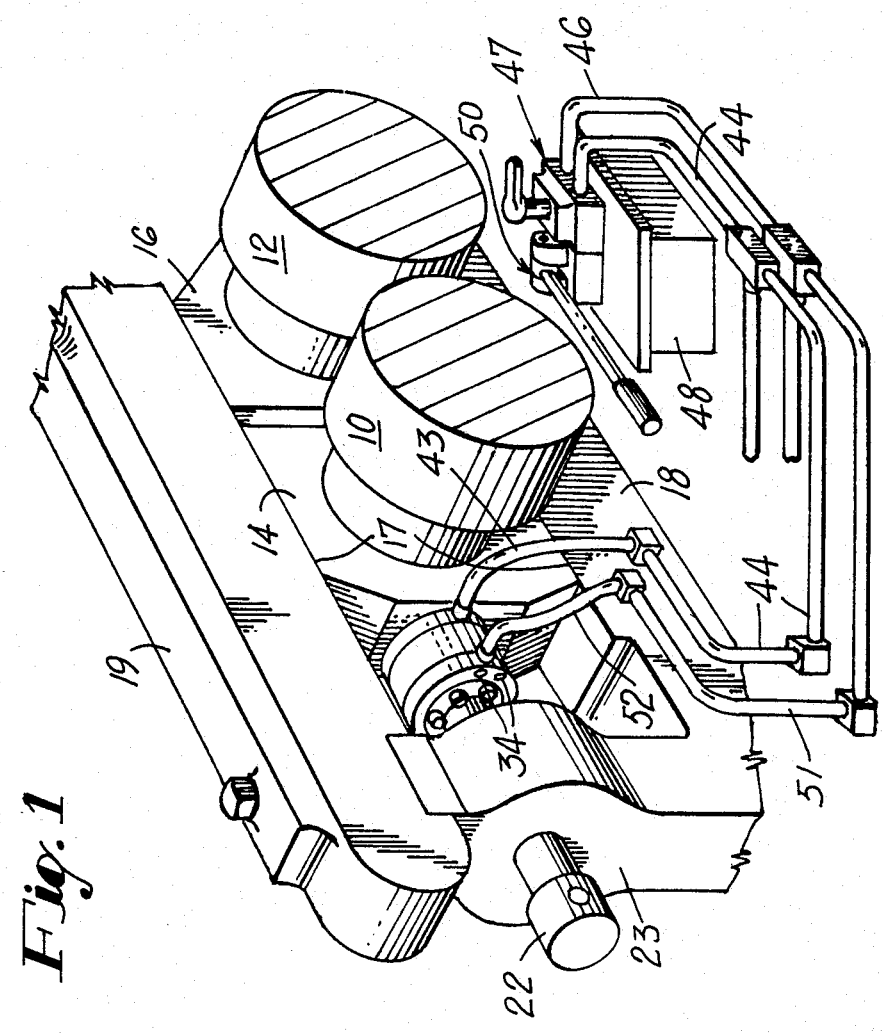
FIG. 1 is a perspective view of one end of a portion of a two roll mill embodying the invention.
Figure 2:
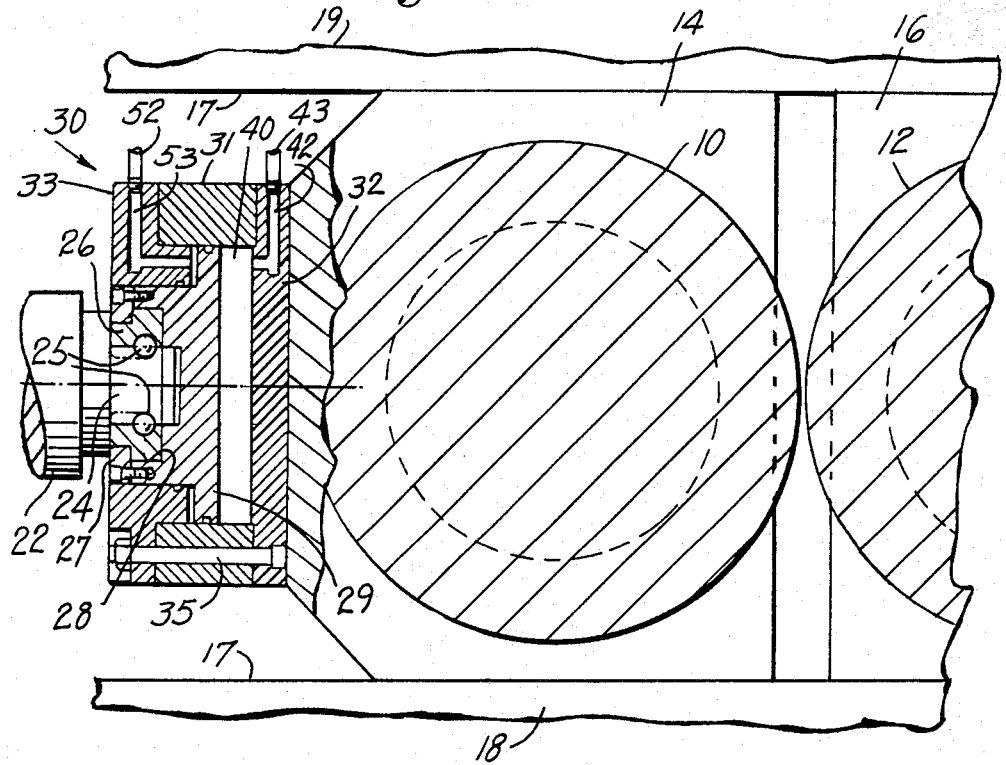
FIG. 2 is an elevation partly in section of the roll adjusting mechanism shown in FIG. 1.

Referring in particular to FIGS. 1 and 2 there is shown a roll positioning mechanism for a two roll mill for producing rubber and plastic sheets and embodying the present invention. As will be seen, the invention is directed to systems for protecting cooperating rolls against overloads or excessive pressure and is equally suitable for application to other sets of cooperating rolls such as for rolling sheet metal and for calendering paper without departing from the scope of the invention.

Figure 3:
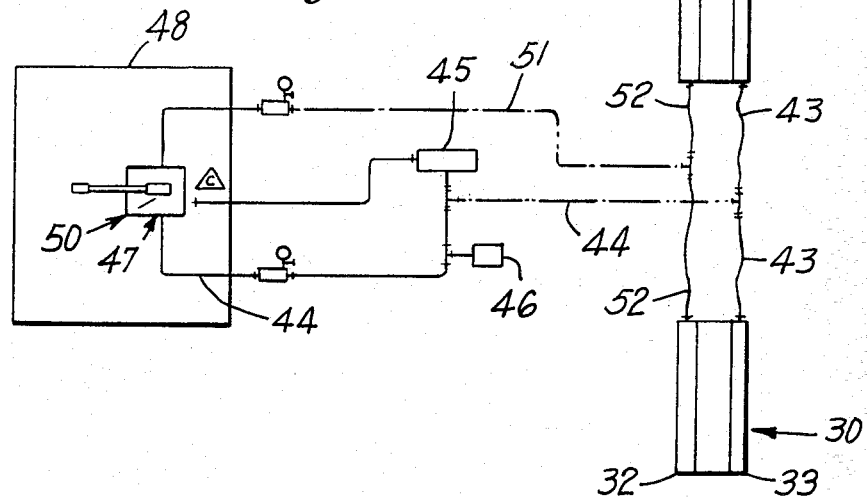
FIG. 3 is a diagrammatic representation of the hydraulic system embodied in the roll adjusting mechanism.

As shown, the machine includes a pair of cooperating rolls 10, 12 each carried at opposite ends for rotation in journal boxes 14, 16 mounted in slideways 17 formed in end frames 18 (only one shown) and its associated retaining cap 19. The journal for carrying the roll 12 is adapted to engage one end of the slideway so as to be substantially fixed. The box 14 is slidable toward and away the journal box 16 to adjust the gap or nip between the rolls as determined by setting an adjusting screw 22 threaded in an upstanding portion 23 of each end frame 18. As best seen in FIG. 2, the inner end 24 of each adjusting screw 22 is secured by pins 25 to a pull back plate 26 held by a retainer ring 27 in a recess 28 in a piston 29. The piston is received in a cylinder 30 having a body 31, a back plate 32 and a front plate 33 bolted together by bolts 35. The back plate 32 of the cylinder is secured by screws 34 (FIG. 1) extending through the plates 32, 33 and the body 31. In normal operation, the space 40 between the piston 29 and the back plate 32 is filled with pressurized fluid through a passage 42 connected by flexible tubing 43 (see also FIGS. 1 and 3) and pipes 44 to one outlet of a valve 47 to which pressurized fluid such as oil is supplied from a sump 48 by a hand pump 50. Appropriate valves (not shown) maintain the pressure in the chamber at a level to withstand the normal roll separation load of the mill. A relief valve 45 is connected to the line 44 and is set to relieve fluid pressure in the line above the normal level.

When overload on the roll is caused such as by excessive forces from the material passing through the roll nip or by foreign material or accidental introduction of parts of an operator's body, the relief valve releases the pressure. The fluid pressure in the cylinder chamber 40 thus is released and the force acting to hold the rolls together is reduced. At the same time a pressure sensitive switch 46 reacts to the excessive pressure and stops (and/or reverses) the motor driving the rolls.

If the overload condition continues, the valve 47 can be manually shifted to open the pipes 44 to exhaust and complete a circuit through a pipe 51 and flexible tubing 52 from the hand pump 50 to a passage 53 in the front plate 33 leading to a chamber in the cylinder between the piston 29 and the front plate. Actuating the hand pump at this time, introduces pressurized fluid to move the cylinder 30 and its associated journal box 14 to the left as seen in FIG. 2. The roll 10 thus can be retracted to increase the space between the two rolls until the piston 29 engages the back plate 32. If required, further clearance between the rolls of course can be obtained by retracting the adjusting screws 22.

When the overload condition is corrected or the foreign material removed, the rolls can easily be returned to operative position. To this end the valve 47 is returned to its initial position and operation of the hand pump 50 pressurizes the chamber 40 to return the cylinder 30 and the boxes 14 to their initial condition. Thus, there is shown a simple mechanism for safeguarding the rolls against overloading and for returning the rolls to their normal condition without the need to dismantle the roll mounting to replace broken shear pins or plates and without the use of complex hydraulic systems.

It should be apparent that various substitutions of parts could be made without departing from the scope of the invention as defined in the appended claims.

I claim:

1. A hydraulic roll protection system for cooperating rolls forming a nip gap including journal boxes carrying the rolls for rotation, at least one roll being movable with respect to a fixed roll for varying the nip gap therebetween, said movable roll being carried by journal boxes slidable in guideways, an adjustable screw associated with each slidable box for adjusting the movable roll toward and away from the fixed roll, a fluid operated piston and cylinder device interposed between one end of each screw and the associated journal box, means including a hand operated pump for pressurizing one end of each cylinder and piston device for movement into extended condition, a pressure relief valve between the pump and the device for controlling the pressure in the cylinder acting to hold the movable roll in adjusted closed condition and to relieve excessive pressure in the cylinder on overload conditions between the rolls, and a valve for switching the fluid pressure from the pump from the one end of the cylinder to the other end of the cylinder to move the piston and cylinder device into retracted condition for retracting the movable roll from the fixed roll.

2. A system according to claim 1 in which the cylinder is fixed to the journal box and the piston in the cylinder is fixed to the adjusting screw.

3. A system according to claim 2 in which the hand pump introduces the fluid pressure to a first chamber between one side of the piston and one end of the cylinder fixed to the journal box.

4. A system according to claim 3 in which a valve is provided to place the first chamber on exhaust and thereby also connect the hand pump to a second chamber between the other side of the piston and the othr end of the cylinder to retract the journal box and the movable roll from the fixed roll.

5. A system according to claim 4 in which the piston is fixed to one end of the adjusting screw so that introduction of fluid to the second chamber moves the cylinder and the associated journal box and the movable roll away from the fixed roll.

6. A system according to claim 4 in which return of the valve to initial condition connects the second chamber to exhaust and connects the first chamber to the hand pump which upon operation returns the movable roll to the initial operating gap position relative to the fixed roll.

* * * * *